(12) United States Patent
Haunhorst

(10) Patent No.: US 6,637,460 B2
(45) Date of Patent: Oct. 28, 2003

(54) DUAL FUNCTION SERVICE COUPLING

(75) Inventor: Gregory A. Haunhorst, Perrysburg, OH (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/243,551

(22) Filed: Sep. 13, 2002

(65) Prior Publication Data

US 2003/0140971 A1 Jul. 31, 2003

Related U.S. Application Data

(63) Continuation-in-part of application No. 10/058,555, filed on Jan. 28, 2002, now Pat. No. 6,450,199.
(60) Provisional application No. 60/394,353, filed on Jul. 8, 2002.

(51) Int. Cl.[7] .................................................. F16L 37/32
(52) U.S. Cl. ........................ 137/614.06; 137/614.03; 137/614.05; 251/282
(58) Field of Search ...................... 137/614.03, 614.05, 137/614.06; 251/282

(56) References Cited

U.S. PATENT DOCUMENTS

| | | | |
|---|---|---|---|
| 4,226,257 A | | 10/1980 | Trinkwalder |
| 4,921,013 A | | 5/1990 | Spalink et al. |
| 5,095,947 A | * | 3/1992 | Weh et al. ............. 137/614.06 |
| 5,139,049 A | | 8/1992 | Jensen et al. |
| 5,339,862 A | | 8/1994 | Haunhorst |
| 5,404,909 A | * | 4/1995 | Hanson .................. 137/614.06 |
| 5,415,200 A | | 5/1995 | Haunhorst et al. |
| 5,450,875 A | | 9/1995 | Chichester et al. |
| 5,586,748 A | | 12/1996 | Kish |
| 5,603,353 A | | 2/1997 | Clark et al. |
| 6,148,858 A | | 11/2000 | Kirkman |
| 6,453,945 B1 | * | 9/2002 | Schumacher et al. .. 137/614.06 |

* cited by examiner

*Primary Examiner*—Kevin Lee
(74) *Attorney, Agent, or Firm*—Rader, Fishman & Grauer PLLC

(57) ABSTRACT

A service coupling for use with either a push-type or a screw-type port valve of a charge port is provided that includes a body portion and an axially moveable valve housing. Axial movement of an actuator permits both the selective axial movement of the valve housing from a rearward position toward a forward position and the selective disengagement of the port valve to open a flow path. In one embodiment the actuator has a nose portion that engages a threaded port valve, or axially moves a push-pin valve, to open a flow path. The operation is the same with either type of type of valve such that the user in not required to know which type of valve is present.

29 Claims, 11 Drawing Sheets

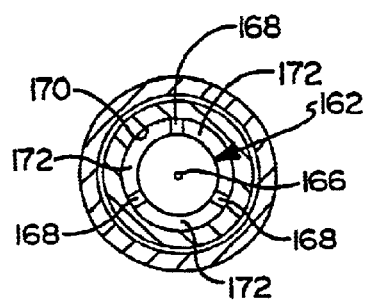
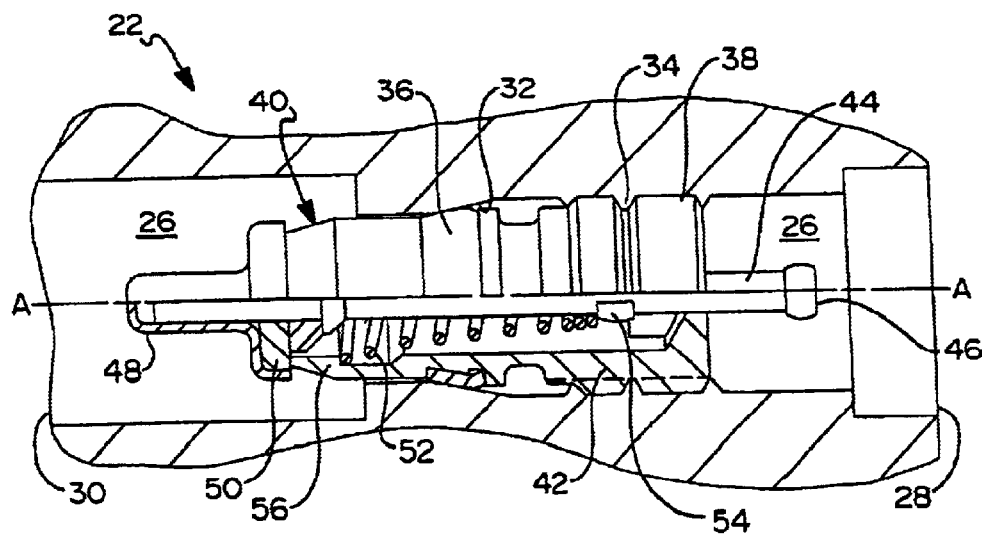

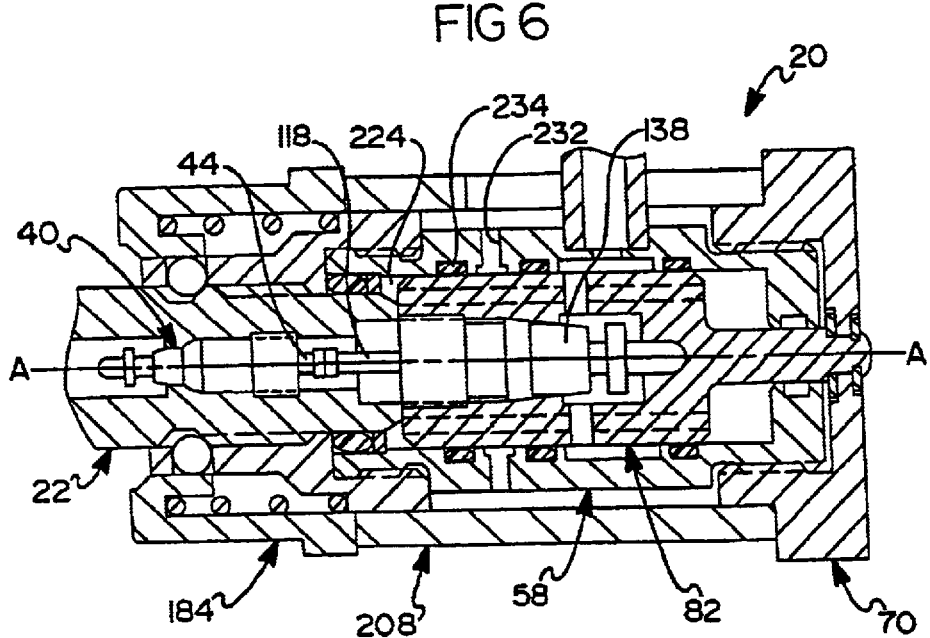
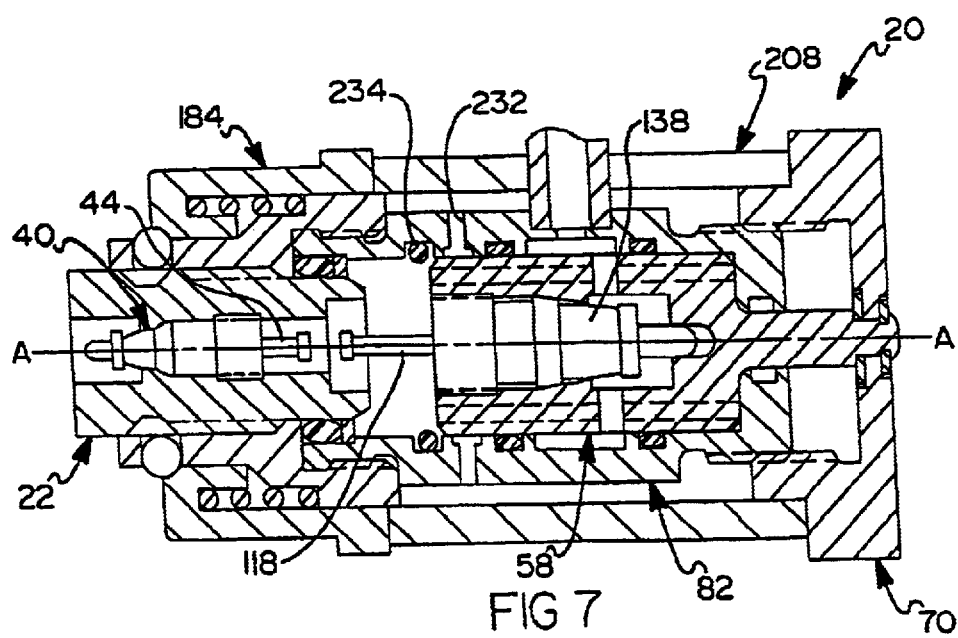

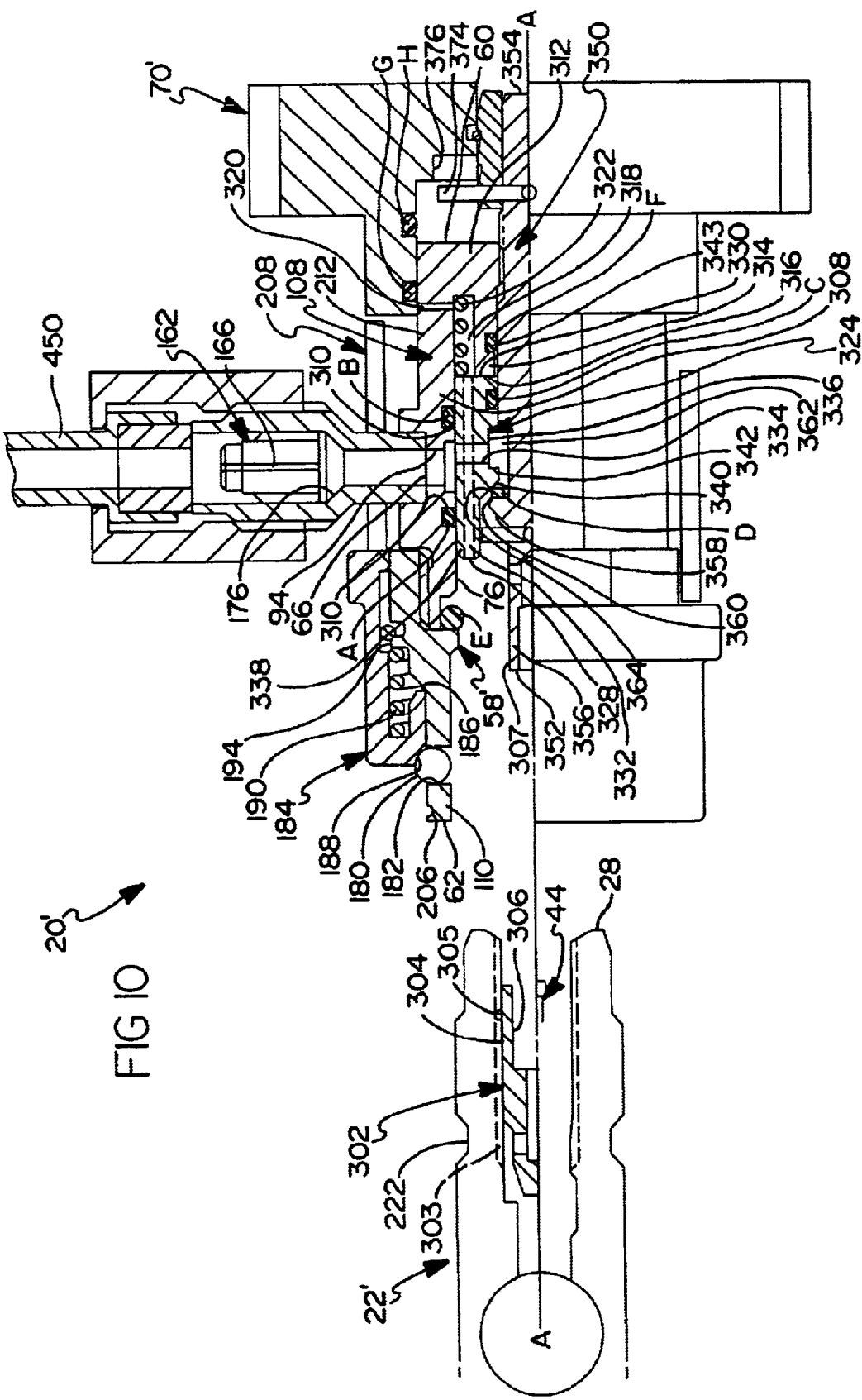

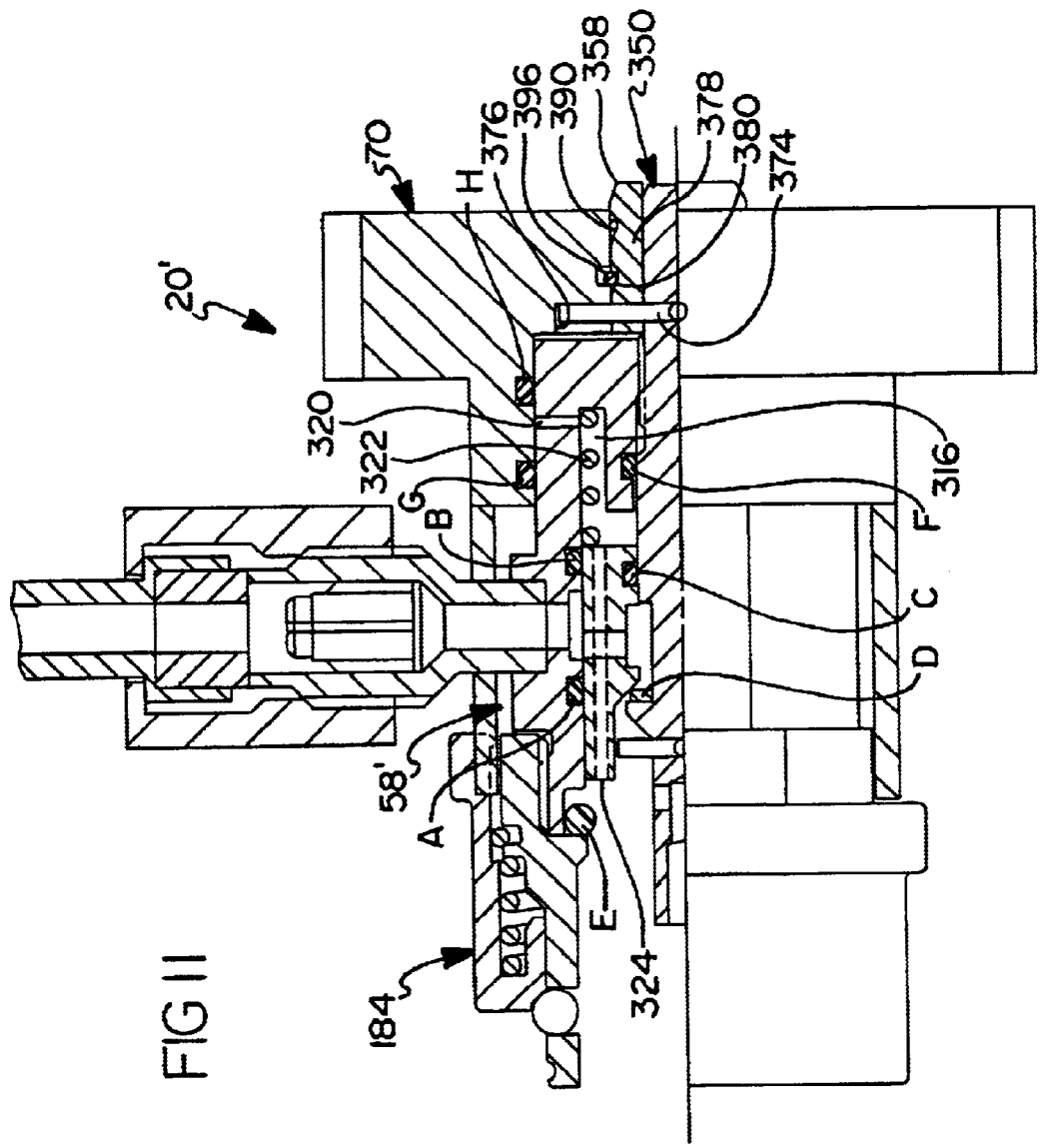

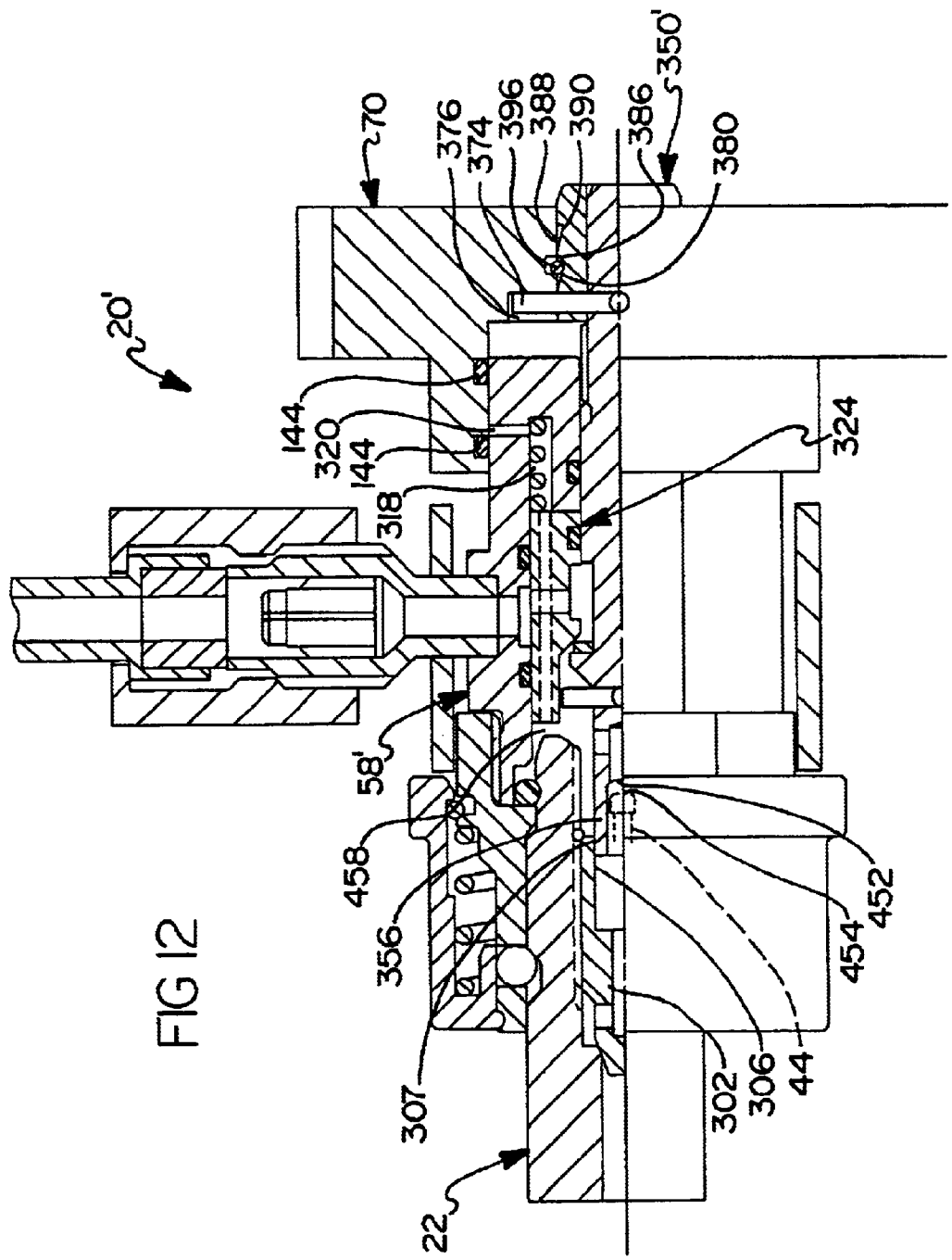

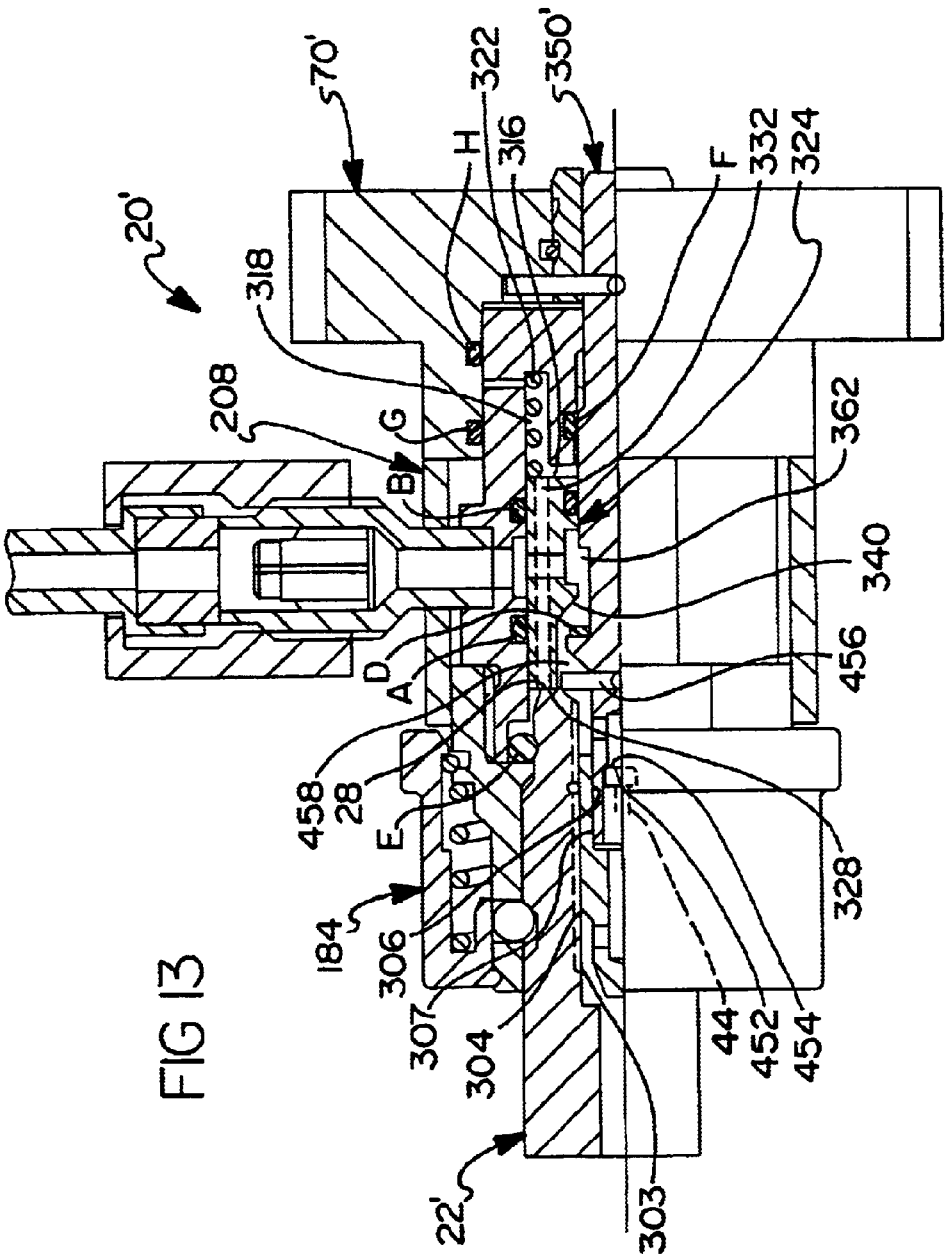

DUAL FUNCTION SERVICE COUPLING

RELATED APPLICATION

The present application is a continuation-in-part of U.S. application Ser. No. 10/058,555, filed Jan. 28, 2002, now U.S. Pat No. 6,450,199, and U.S. provisional Application No. 60/394,353, filed Jul. 8, 2002, the contents of which are incorporated herein in their entirety.

BACKGROUND OF THE INVENTION

1. Field of the Invention

The present invention relates to a service coupling for use in directing refrigerant from a refrigerant supply source to a refrigeration system through a charging port which is normally attached to the refrigeration system and in communication therewith. The service coupling may also be used to evacuate refrigerant from a refrigeration system.

2. Description of the Related Art

Traditional refrigerants, such as chlorofluorocarbons (CFCs) and hydrochlorofluorocarbons (HCFCs), are strictly regulated because of their contribution to the depletion of ozone in the atmosphere. The search for new and environmentally benign refrigerants to replace the existing CFCs and HCFCs led to the introduction of hydrofluorocarbons (HFCs), such as R134a. However, HFCs still exhibit a relatively high global-warming potential (GWP) and higher usage costs as compared to natural refrigerants, such as carbon dioxide and ammonia. These concerns have spurred calls for the investigation of alternative refrigeration systems employing refrigerants other than HFCs. The automotive air-conditioning industry has already begun to address the challenges of replacing HFCs, through the development of refrigeration systems employing carbon dioxide as the refrigerant.

Service couplings or adapters used to direct refrigerant from a refrigerant supply source to a refrigeration system through an inlet or "charging" port in the refrigeration system, are well known in the art. One known service coupling employs one or more features that allow for a "quick connect" to the charging port of the refrigeration system. Once connected, a service valve in the service coupling engages and actuates a port valve in the charging port to open a refrigerant flow path between the charging port and the service coupling. The service valve is typically moved into engagement with the port valve by a rotatable knob that is threadably connected to the service coupling.

Conventional service couplings, such as those used to service automotive R134a air-conditioning systems, are generally designed to function at pressures up to approximately 100 psi (6.9 bar). However, refrigeration systems employing carbon dioxide as the refrigerant typically operate at pressures significantly higher than typical R134a refrigeration systems, i.e., greater than 100 psi (6.9 bar).

Due to these relatively high pressures, conventional service couplings suffer from several limitations that generally preclude their use in refrigeration systems employing carbon dioxide. One limitation is that the relatively high refrigerant pressure applies a significant load on the service valve, thereby requiring an excessive amount of torque to turn the knob.

Another limitation is that the "quick connect" features of the service coupling are rendered virtually inoperable due to entrapped pressurized refrigerant between the service coupling and charging port prior to disconnection. This trapped pressure also causes an undesirable violent disconnection of the service coupling from the charging port.

Still another limitation is that the refrigerant flow rate through a conventional service coupling during evacuation of a refrigeration system is relatively high. In a refrigeration system employing carbon dioxide as the refrigerant, a relatively high evacuation flow rate may cause explosive decompression of the seals, i.e., the undesirable rapid expansion of gaseous refrigerant trapped in a seal. A relatively high evacuation flow rate may also lead to the formation of "dry ice" in the charging port or service coupling, which could prevent re-sealing of the service and port valves and allow the refrigerant to escape.

Therefore an improved service coupling is required for charging and evacuating relatively high-pressure refrigerant systems, such as those employing carbon dioxide.

SUMMARY OF THE INVENTION

A service coupling is provided for connecting a refrigerant supply source to a refrigeration system having a charging port that includes an axially displaceable port valve. The service coupling includes a body portion having a central passageway extending along an axis from an adjustment end to an outlet end and a lateral port positioned between the ends providing communication between the central passageway and the refrigerant source. An axially moveable valve housing is disposed in the central passageway. The valve housing extends from a first end positioned between the lateral port and the outlet end and a second end positioned proximate the adjustment end. The valve housing includes at least one pressure balancing passage that extends therethrough from the first end to the second end, and a service valve sealingly engaged within the valve housing. An actuator is provided to move the valve housing from a rearward position toward the adjustment end to a forward position toward the outlet end. Axial movement of the valve housing to the forward position causes the service valve to abut and disengage the port valve from sealing engagement in the charging port and the service valve from sealing engagement in the valve housing to open a refrigerant flow path. Axial movement of the valve housing to the forward position also creates a void between the second end of the valve housing and the body portion. The void is provided in communication with the refrigerant flow path by the at least one passage that extends through the valve housing, such that the pressure is substantially balanced on either end of the valve housing. The balance of pressure on either side of the valve housing results in only a minimum amount of force being required to move the valve housing within the central passageway.

In another embodiment of the present invention, the service coupling is provided with at least one bleed passage for venting pressurized refrigerant trapped between the service coupling and the charging port prior to disconnection. Movement of the valve housing to the forward position seals the bleed passage, whereas movement of the valve housing to the rearward position closes the flow path and permits the residual refrigerant trapped between charging port and service coupling to be released through the unsealed bleed passage.

In yet another embodiment of the present invention, the lateral port is provided with a coupling member for connecting the service coupling to a refrigerant supply/evacuation system. The coupling member includes a check valve or restrictor that is configured to restrict refrigerant flow through the lateral port in a first direction and to permit substantially unrestricted refrigerant flow through the lateral port in a second direction opposite the first direction.

In another embodiment of the invention, the charging port may include either a push-type valve or a screw-type valve. The valve body is a shaft having additional functionality and the valve housing comprises a safety sleeve working in combination with the rigidly positioned body portion of the valve. The service coupling will work in an operationally equivalent manner with either type of valve.

Among other advantages, the novel design of the inventive service coupling permits a refrigerant flow path to be opened between the charging port of a relatively high-pressure system and the service coupling with minimal effort. Another advantage is that the refrigerant trapped between the charging port and the service coupling is automatically vented after closing of the service valve and port valve, permitting an easy and relatively non-violent disconnection of the service coupling from the charging port. Still another advantage is that the flow rate of the refrigerant being evacuated from the refrigerant system is readily controlled by the check valve to minimize the occurrence of explosive decompression or the formation of dry ice.

Various additional aspects and advantages of this invention will become apparent to those skilled in the art from the following detailed description of the preferred embodiment, when read in light of the accompanying drawings.

BRIEF DESCRIPTION OF THE DRAWINGS

FIG. 4 is a cross sectional view of a coupling member taken along lines 4—4 in FIG. 3.

FIG. 5 is an enlarged partial sectional view of the charging port of FIGS. 1–3.

FIG. 6 is a cross sectional view of an alternate embodiment of the present invention showing the service coupling attached to the charging port with the service valve and the port valve in the open position.

FIG. 7 is a cross sectional view of the service coupling of FIG. 6 showing the service valve and the port valve in the closed position.

FIG. 10 discloses an embodiment of a dual function service coupling for use with either a push-type or screw-type charging port showing the service coupling in a disengaged state.

FIG. 11 discloses the embodiment of FIG. 10 with the knob in the engaged state without being connected to the charging port.

FIG. 12 discloses the embodiment of FIG. 10 with the service coupling engaging the charging port.

FIG. 13 discloses the embodiment of FIG. 10 with the service coupling engaging the charging port and the knob in the engaged state to permit the flow of fluid.

DESCRIPTION OF THE PREFERRED EMBODIMENT

Figure 1:
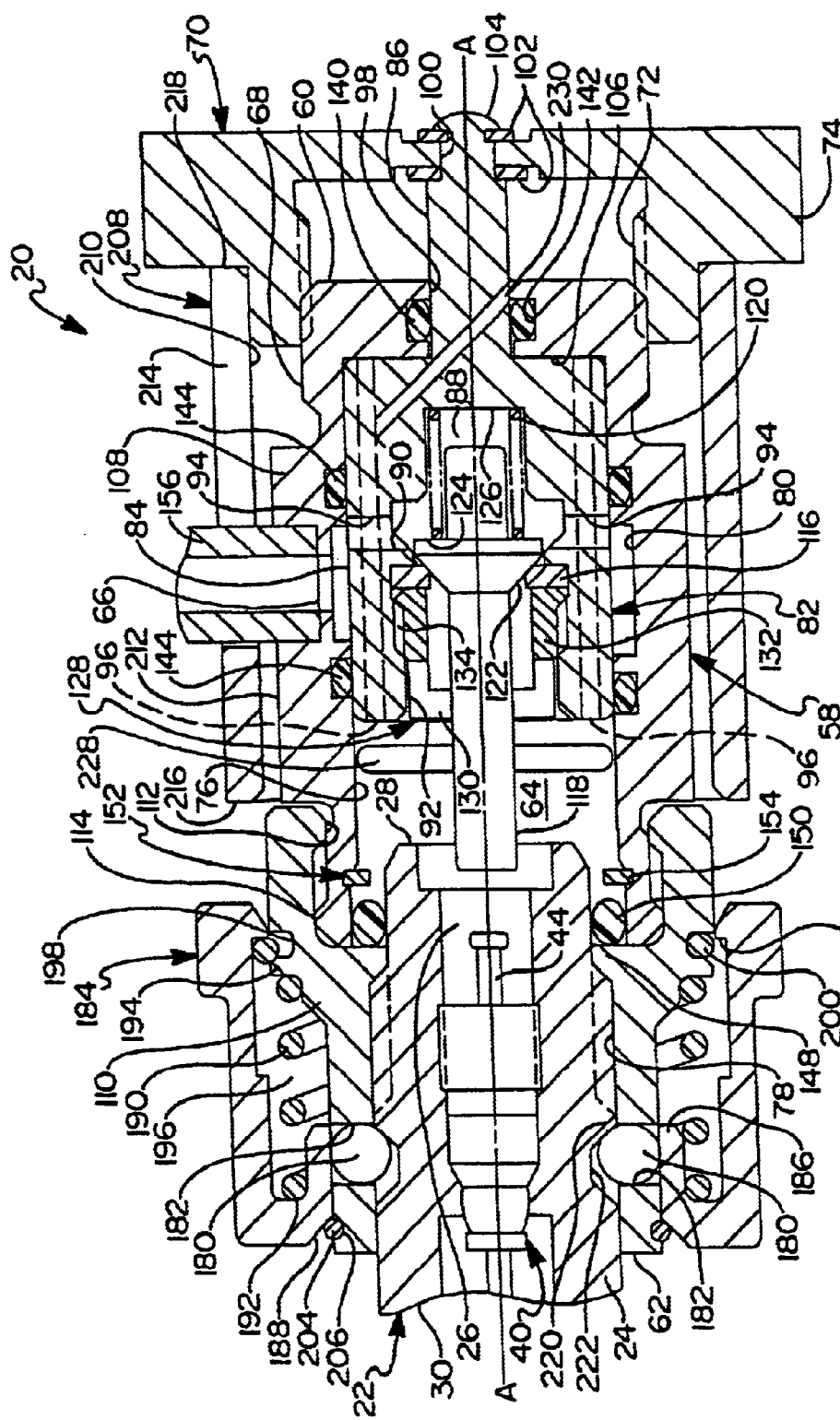
FIG. 1 is a cross sectional view of a service coupling according to a preferred embodiment of the present invention attached to a charging port of a refrigeration system.

Referring now to FIG. 1, there is provided a service coupling 20 intended to be affixed to a charging port 22, which functions as an inlet for refrigerant being introduced into a refrigeration system to which the charging port 22 is connected. When joined together, service coupling 20 and charging port 22 exhibit a common longitudinal axis A—A.

Charging port 22 may be of a conventional type and, in and of itself, forms no part of the present invention. However, a remedial understanding of charging port 22 will assist in explaining operation of service coupling 20.

Charging port 22 includes a body 24 having a central passage 26 extending therethrough from an inlet end 28 to an outlet end 30. As illustrated in FIG. 5, central passage 26 includes a reduced diameter cylindrical valve seat 32 and internal threads 34 for engaging a polymeric sealing element 36 and external threads 38, respectively, of a valve core 40.

Figure 2:
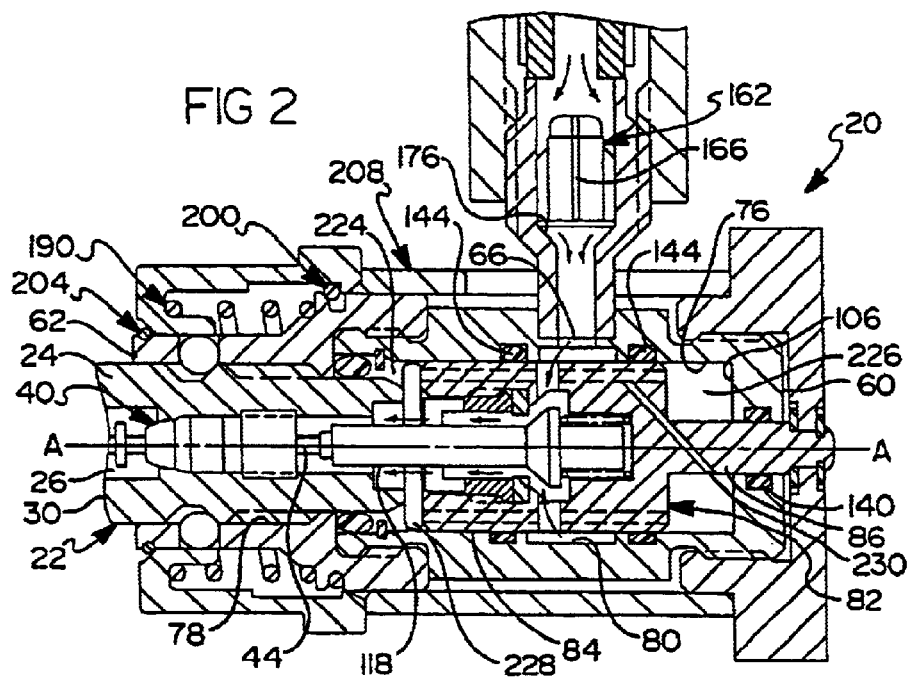
FIG. 2 is a cross sectional view similar to FIG. 1 showing the relative position of the parts in an open position following actuation of a service valve and a port valve.

Referring still to FIG. 5, valve core 40 includes a core body 42 within which a port valve 44 is slidably disposed. A first end 46 of port valve 44 extends outwardly beyond core body 42 and a second end 48 of port valve 44 is connected to a sealing member 50. A compression spring 52 extends between an annular lip 54 of port valve 44 and a radial shoulder 56 on core body 42 to yieldingly urge port valve 44 toward the inlet end 28 and to cause sealing member 50 to sealingly engage core body 42. Movement of port valve 44 toward outlet end 30 (to the left as viewed in FIG. 5) disengages sealing member 50 from core body 42, thereby opening valve core 40 (as shown in FIG. 2) to permit the flow of refrigerant through charging port 22.

Referring to FIG. 1, service coupling 20 includes a body portion 58 that extends from an adjustment end 60 to an outlet end 62. A central passage 64 extends from adjustment end 60 to outlet end 62 and communicates with a lateral supply hose port 66 formed in body portion 58 between adjustment end 60 and outlet end 62. Externally disposed threads 68 are formed on body portion 58 adjacent adjustment end 60. A rotatable knob 70 is disposed on adjustment end 60 and includes internal threads 72 that are engaged with threads 68 and an enlarged gripping portion 74 that extends axially beyond adjustment end 60.

Central passage 64 of body portion 58 is provided with a first internal diameter 76 in the vicinity of adjustment end 60, a second internal diameter 78 in the vicinity of outlet end 62 and an enlarged annular channel 80 aligned with lateral port 66. Positioned within central passage 64 is a valve housing 82 sized to be snugly but slidingly received inwardly of first internal diameter 76. Valve housing 82 includes a generally cylindrical body 84, having a central axis common with axis A—A, and an adjustment post 86 that protrudes outwardly from body 84 along axis A—A. Body 84 includes an inner cavity 88 within which inwardly extends a shoulder 90 and internal threads 92. A plurality of flow holes 94 are disposed through body 84 and intersect cavity 88 at a substantially right angle with respect to axis A—A. Body 84 also includes at least one pressure balancing passage 96 (shown in phantom in FIGS. 1–3) that extends from one end of body 84 to the other. Passage 96 is disposed between flow holes 94 such that passage 96 and flow holes 94 do not intersect.

Valve housing 82 is connected to knob 70 for movement therewith as knob 70 is threaded onto and off of body portion 58. In a preferred embodiment, a portion of adjustment post 86 extends through a hole 98 in body portion 58 and a axially aligned hole 100 in knob 70. A pair of washers 102 is disposed over adjustment post 86 on either side of knob 70. During manufacture of service coupling 20, a distal end 104 of adjustment post 86 is swaged or otherwise deformed to prevent washers 102 and knob 70 from sliding off adjustment post 86 during rotation. Washers 102 slide against knob 70, permitting knob 70 to rotate freely with respect to adjustment post 86.

Rotation of knob 70, and the axial movement thereof resulting from interengagement of threads 68 and 72, causes valve housing 82 to (1) move axially to a rearward position toward adjustment end 60 (to the right in FIGS. 1–3) upon rotation of knob 70 in a first predetermined direction and (2) move it to a forward position toward outlet end 62 upon rotation of knob 70 in the opposite direction. Excessive retraction of valve housing 82 toward adjustment end 60 is prevented by abutment of valve housing 82 with a shoulder 106 formed in body portion 58 between first internal diameter 76 and hole 98.

Figure 3:
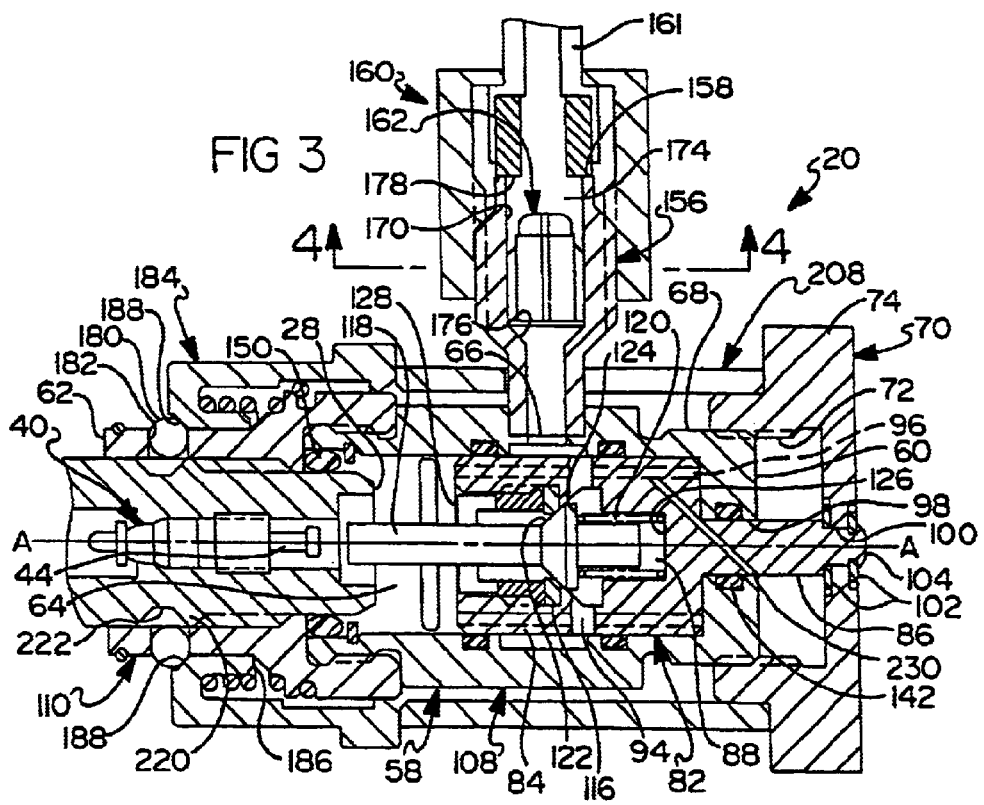
FIG. 3 is a cross sectional view similar to FIG. 1 showing the relative position of the parts in a closed position during disconnection of the service coupling from the charging port.

Depending on the external diameters of charging port 22 and valve housing 82, body portion 58 may be optionally divided into two or more sections to facilitate assembly of service coupling 20. As illustrated in FIGS. 1–3, body portion 58 is preferably divided into a first section 108 that includes first internal diameter 76 and a second section 110 that includes second internal diameter 78. Second section 110 includes an internally threaded portion 112 that is threaded onto an externally threaded portion 114 of first section 108 during assembly. In the embodiment illustrated in FIGS. 1–3, because the external diameter of valve housing 82 is larger than second internal diameter 78, valve housing 82 is assembled into first section 108 prior to securing second section 110 to first section 108. However, in an alternate embodiment of the present invention (not illustrated), valve housing 82 may exhibit an external diameter that is smaller than second internal diameter 78 allowing body portion 58 to be manufactured as a single member.

Received within cavity 88 of valve housing 82 is a sealing member 116 and a service valve 118 that is biased against sealing member 116 by a resiliently compressible member 120, such as a compression spring. Sealing member 116, which is preferably manufactured of a polymeric material, such as EPDM rubber or PTFE, abuts inwardly directed shoulder 90. Sealing member 116 is preferably a flat, annular gasket, as illustrated in FIGS. 1–3 or, alternatively, may be an O-ring. Service valve 118 includes a generally conical seat 122 extending therefrom that sealingly engages sealing member 116 to substantially prevent refrigerant flow through service coupling 20. One end of resiliently compressible member 120 abuts a shoulder 124 of seat 122 and the other end abuts an inner wall 126 of cavity 88.

A valve retainer 128 is also received in cavity 88 to secure sealing member 116, service valve 118 and resilient compressible member 120 within cavity 88 of valve housing 82. Valve retainer 128 preferably includes a guide portion 130, through which service valve 118 extends, and a cylindrical base portion 132 having external threads 134 that engage internal threads 92 in cavity 88. Guide portion 132 is a generally rectangular member having a width large enough to support service valve 118, yet narrow enough to allow the passage of refrigerant, as illustrated in FIG. 2. Base portion 132 of valve retainer 128 abuts sealing member 116 to maintain sealing member 116 against shoulder 90.

Referring to FIGS. 6 and 7, an alternate embodiment of valve housing 82 is shown in detail. In this embodiment, service valve 118, sealing member 116 and valve retainer 128 comprise a valve core assembly 138. Valve core assembly 138 may be substantially similar to valve core 40 described above in charging port 22, but is not necessarily limited thereto. Accordingly, other valve core assembly designs, such as those commonly found in tire stems, may also be suitable for use in the present invention. Employing valve core assembly 138 in place of individual components 116, 118 and 128 advantageously eliminates one or more manufacturing steps and allows easy replacement of worn or damaged seals.

Referring again to FIG. 1, an annular sealing element 140 is disposed in a first outwardly directed groove 142 positioned in an inner wall of hole 98 to substantially prevent the escape of refrigerant when valve housing 82 is moved to the forward position toward outlet end 62. Similarly, a pair of annular sealing elements 144 is provided in body portion 58 on the adjustment end side and the outlet end side of lateral port 66. Sealing elements 144 abut valve housing 82 and substantially prevent the passage of refrigerant between body portion 58 and valve housing 82. Sealing elements 140 and 144 may be a typical rubber O-ring or a PTFE spring-energized "U-cup," as is known in the art.

Body portion 58, and more particularly second section 110, preferably includes an inwardly directed shoulder 148 against which is held an annular sealing member 150, such as an O-ring. Sealing member 150 sealingly engages charging port 22 as it is received in service coupling 20 to seal against the escape of refrigerant between charging port 22 and service coupling 20. Sealing member 150 is restricted against substantial axial movement within passage 64 by shoulder 148 and a snap-ring 152 that is received within an outwardly facing groove 154 in first internal diameter 76.

Referring now to FIG. 3, lateral port 66 is preferably provided with a coupling member 156 for connecting service coupling 20 to a source of refrigerant (not illustrated). In a preferred embodiment, an external end 158 of coupling member 156 is configured to mate with a female coupling 160 that is attached to a fitting 161 of a service hose or other conduit for transferring refrigerant from a conventional refrigerant supply/evacuation system. The coupling member 156 design illustrated in FIGS. 2 and 3 is not intended to limit the scope of the invention, and may include other configurations, such as a conventional female threaded adapter.

Within coupling member 156 is disposed a check valve or restrictor 162 to regulate the flow rate of refrigerant exiting charging port 22 through service coupling 20. Referring to FIG. 4, restrictor 162 includes an axial capillary duct 166 having a predetermined diameter that corresponds to the desired refrigerant flow rate. Restrictor 162 is provided with a plurality of radial fins 168 that cooperate with an interior surface 170 of coupling member 156 to create a plurality of flow channels 172 (best seen in FIG. 4) for the free flow of refrigerant. A void 174 (best seen in FIG. 3), which is defined between a tapered surface 176 of coupling member 156 and a shoulder 178 of female coupling 160, allows for a limited degree of axial movement of restrictor 162. As illustrated in FIG. 2, when the flow of refrigerant is entering service coupling 20 from the refrigerant supply/evacuation system, restrictor 162 is forced against tapered surface 176, permitting a substantially unrestricted flow of refrigerant through flow channels 172. Alternatively, when the flow of refrigerant is entering service coupling 20 from charging port 22, restrictor 162 is forced against shoulder 178, thereby restricting the flow of refrigerant through capillary 166.

Referring again to FIG. 1, service coupling 20 is preferably connected to charging port 22 by a plurality of detent balls 180 located within radial holes 182 defined in the wall of body portion 58 adjacent outlet end 62. An annular locking sleeve 184 encircles body portion 58 adjacent outlet end 62 and is axially slideable thereon. Locking sleeve 184 is provided with an inwardly facing flange 186 having a conical cam surface 188 flaring outwardly therefrom in a direction toward outlet end 62. A resilient member 190, such as a compression spring or the like, biases locking sleeve 184 toward outlet end 62. Extending radially outwardly from flange 186 is a shoulder 192 that cooperates with an outwardly directed flange 194 on body portion 58 to define a chamber 196 within which resilient member 190 is positioned to yieldingly urge locking sleeve 184 toward outlet end 62.

The area of body portion 58 adjacent flange 194 is preferably provided with an inwardly facing annular groove 198 in which is positioned a retaining ring 200. Retaining ring 200 abuts both flange 194 and a shoulder 202 on locking sleeve 184, as shown in FIG. 1, to prevent the removal of locking sleeve 184 from body portion 58. Alternatively, or in combination with retaining ring 200, a second retaining ring 204 may be disposed in a groove 206 proximate outlet end 62, which also functions to prevent removal of locking sleeve 184 from body portion 58.

Service coupling 20 is preferably provided with an interlock sleeve 208 to prevent the inadvertent release of service coupling 20 from charging port 22 when the refrigerant flow path is open. Referring to FIGS. 1–3, interlock sleeve 208 is a generally cylindrical member having an inner diameter 210 that is slightly larger than the external diameter 212 of body portion 58. Interlock sleeve 208 is provided with a channel 214 having a width slightly larger than the diameter of coupling member 156. A first end 216 of interlock sleeve 208 engages locking sleeve 184 and a second end 218 of interlock sleeve 208 engages knob 70. Referring to FIG. 2, when knob 70 has been rotated to a position that causes service valve 118 and port valve 44 to open, interlock sleeve 208 abuts locking sleeve 184 to prevent locking sleeve 184 from being retracted to a position that would release charging port 22. On the other hand, as illustrated in FIG. 3, when knob 70 is rotated to a position that closes service valve 118 and port valve 44, interlock sleeve 208 can be slid on body portion 58 to a position that allows locking sleeve 184 to release charging port 22.

In operation, when service coupling 20 is disengaged from charging port 22, locking sleeve 184 will be in its non-retracted or forward position shown in FIG. 2 and held in such position by the biasing force of resilient member 190. Service coupling 20 is engaged to charging port 20 by retracting locking sleeve 184, as shown in FIG. 3, which allows detent balls 180 to move outwardly as service coupling 20 engages charging port 22.

As service coupling 20 engages charging port 22, inlet end 28 of charging port 22 will enter into outlet end 62 of service coupling 20 and sealingly engages sealing member 150. Further axial movement of charging port 22 toward adjustment end 60 causes detent balls 180 to ride over a shoulder 220 on charging port 20 until detent balls 180 are radially in line with a groove 222 in charging port 22. Detent balls 180 are forced radially inwardly as a result of the urging of locking sleeve 184 toward outlet end 62 in response to urging of resilient member 190 and the action of conical cam surface 188 forcing detent balls 180 radially inwardly. Detent balls 180 engage a side of shoulder 220 furthest removed from charging port inlet end 28 to secure service coupling 20 to charging port 22.

With service coupling 20 and charging port 22 thus engaged, as illustrated in FIG. 1, it should be noted that there is no flow of refrigerant through the joined parts. Thus, within charging port 22, sealing member 50 is sealingly engaged with core body 42, and within service coupling 20, service valve 118 is sealingly engaged with sealing member 116.

Prior to opening of service valve 118 and port valve 44, service coupling 20 is pressurized through the service hose or other conduit that is attached to the refrigerant supply/evacuation system. Sealing members 144 on either side of lateral port 66 prevent refrigerant from passing between body portion 58 and valve housing 82. Therefore, there is no pressure force acting axially on valve assembly 82 that would inhibit rotation of knob 70 to open service coupling 20.

To open service coupling 20 and charging port 22 to the flow of refrigerant through lateral port 66, knob 70 is rotated in a first predetermined direction causing knob 70 to move axially to the position shown in FIG. 2. Such rotation of knob 70 does not cause substantial rotation of valve housing 82 as a result of frictional resistance to such rotation by virtue of valve housing 82 being in contact with sealing members 140 and 144. Axial movement of valve housing 82 from the position of FIG. 1 to the position of FIG. 2 causes service valve 118 to directly engage port valve 44.

Once service valve 118 contacts port valve 44, there is some resistance to further axial movement of valves 118, 44 due to pressure in the refrigeration system acting against port valve 44. However, this resistance is generally insignificant due to the relatively small diameter of port valve 44. Referring to FIG. 2, as valves 118 and 44 begin to open, a first cavity 224, that is formed between charging port 22 and valve housing 82, quickly fills with pressurized refrigerant. Virtually simultaneously, passage 96 allows a second cavity or void 226, formed between valve housing 82 and shoulder 106, to reach the same pressure. The substantially balanced pressure on either side of valve housing 82 results in only a minimal axial force (generally the combined biasing force of the compressing valve springs) being applied to knob 70. Therefore, an acceptable amount of torque is all that is required to rotate knob 70. Complete rotation of knob 70 in the first predetermined direction causes service valve 118 and port valve 44 to be actuated to the fully retracted or "open" positions, permitting full refrigerant flow.

Depending on the biasing force exerted against both service valve 118 and port valve 44, it is possible that service valve 118 will not be actuated to the fully "open" position. To ensure that service valve 118 is fully actuated, a dowel pin 228 may be provided through the portion of service valve 118 that extends outwardly beyond valve housing 82. During insertion of charging port 22 into service coupling 20, inlet end 28 of charging port 22 will engage dowel pin 228 and actuate service valve 118 to the fully "open" position shown in FIG. 2.

In order to disconnect service coupling 20 from charging port 22, it is simply necessary to rotate knob 70 to close valves 118, 44 and manually retract locking sleeve 184 to the position shown in FIG. 3. This retraction moves shoulder 188 of locking sleeve 184 out of engagement with detent balls 180 and thereby aligns detent balls 180 with the enlarged cylindrical wall 182 permitting detent balls 180 to move radially outwardly to disengage them from shoulder 220 of charging port 22. However, manual retraction of locking sleeve 184 is rendered difficult if not impossible due to the trapped refrigerant pressure in first cavity 224. The trapped refrigerant exerts an axial force on charging port 22, which is redirected into locking sleeve 184 through detent balls 180. Therefore, it is necessary to vent the pressure trapped in first cavity 224 prior to disconnecting service coupling 20.

To reduce pressure in first cavity 224, a pressure bleed passage 230 is provided between first cavity 224 and the exterior of service coupling 20. In a preferred embodiment of the present invention, pressure bleed passage 230 extends between channel 96 and an exterior surface of adjustment post 96, as illustrated in FIGS. 2 and 3. When valve housing 82 is moved to the forward position toward outlet end 62, pressure bleed passage 230 assists longitudinal channels 96 in providing first cavity 224 in communication with second cavity 226, as shown in FIG. 1. When valve housing 82 is moved to the rearward position toward adjustment end 60, pressure bleed passage 230 extends beyond sealing member 142, as shown in FIG. 3, allowing the pressure in first cavity 224 to be vented to the environment. The release of refrigerant to the environment is very small, as is characteristic of conventional service couplings. In an alternate embodiment, as illustrated in FIG. 8, a pressure bleed passage 230' or 230" may be provided through adjustment post 86, such that the pressure in second cavity 226 is vented to the environment when valve housing 82 is moved to the rearward position.

Figure 8:
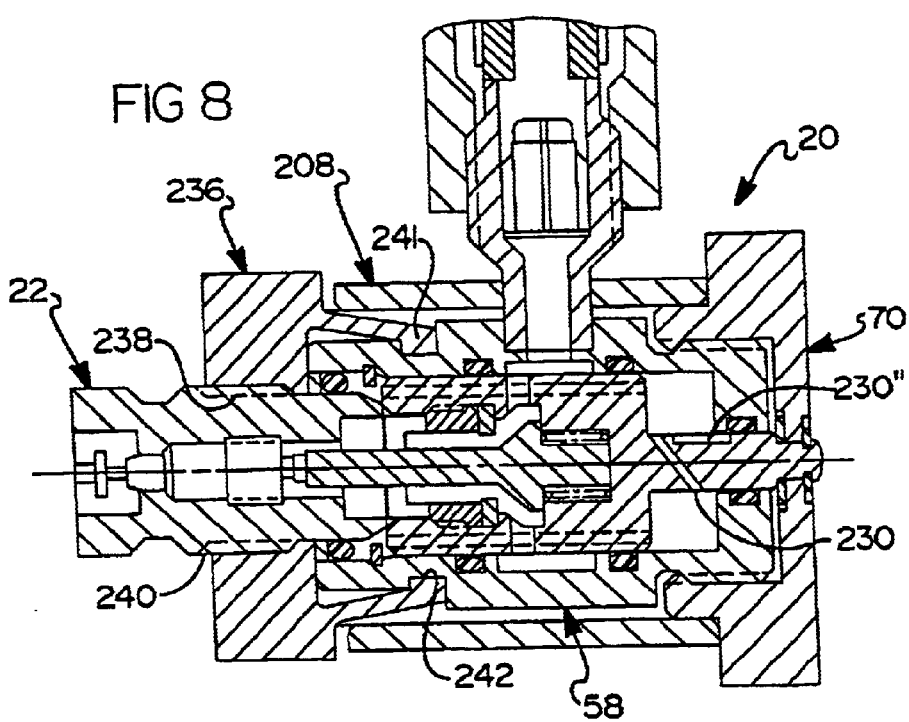
FIG. 8 is a cross sectional view of another alternate embodiment of the present invention showing the service coupling attached to the charging port with the service valve and the port valve in the open position.

Alternatively, or in combination with the bleed passage configurations illustrated in FIGS. 1 and 8, at least one bleed passage 232 may be provided directly through body portion 58 to vent the pressure in first cavity 224 to the environment, as illustrated in FIGS. 6 and 7. In this embodiment, an additional sealing member 234 is required in body portion 58 downstream of pressure bleed passage 232 to seal against valve housing 82 when valve housing 82 is moved to the forward position. When valve housing 82 is retracted to the rearward position toward adjustment end 60, as shown in FIG. 7, sealing member 234 is disengaged from valve housing 82 allowing the trapped pressure in first cavity 224 to escape through bleed passage 232.

Referring to FIG. 8, another alternate embodiment of the present invention is shown in detail. In this embodiment, service coupling 20 is provided with a rotatable nut 236 instead of a retractable locking sleeve 184 to secure service coupling 20 to charging port 22. Nut 236 is provided with an internally threaded surface 238 that engages an externally threaded surface 240 of charging port 22. Nut 236 also includes an anchor portion 241 that engages an inwardly directed groove 242 in body portion 58. Anchor portion 241 allows nut 236 to rotate with respect to body portion 58, but prevents axial movement thereon. To prevent the inadvertent release of charging port 22, interlock sleeve 208 may be provided with an internally splined surface that engages an externally splined surface (none illustrated) on nut 236 as interlock sleeve 208 is moved forward due to rotation of knob 70.

Figure 9:
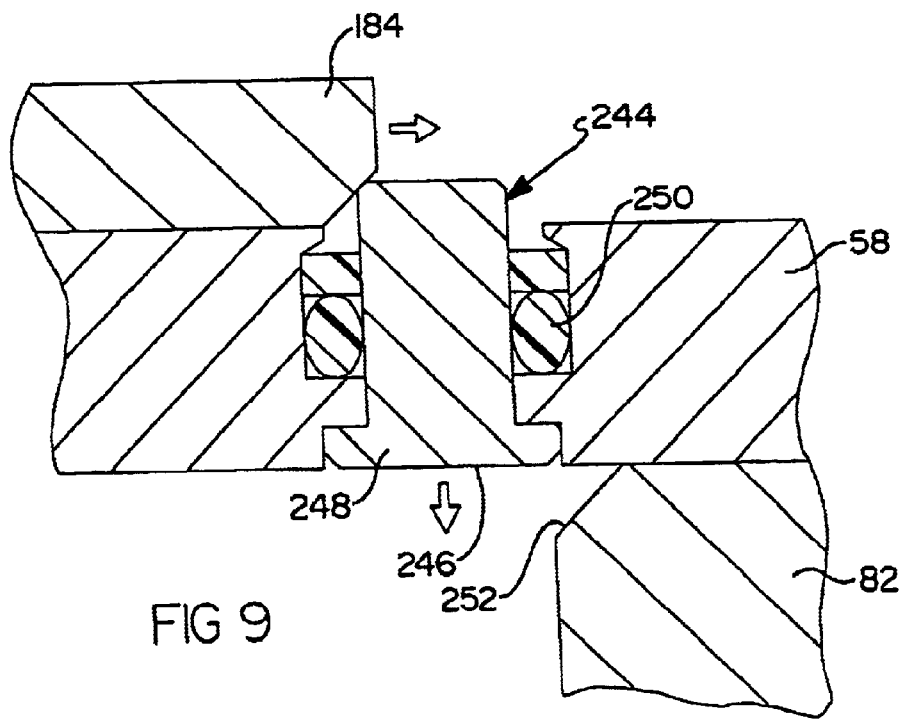
FIG. 9 is an enlarged cross sectional view of still another alternate embodiment of the present invention showing the relative position of a locking sleeve, pin and valve housing during disconnection of the service coupling from the charging port.

Referring to FIG. 9, an alternate embodiment of the present invention is shown in detail. In this embodiment, service coupling 20 does not include an interlock sleeve 208 to prevent inadvertent release of charging port 22. Instead, a radially moveable pin 244 is provided in body portion 58 that extends radially outwardly when valve housing 82 is actuated toward outlet end 62 to prevent locking sleeve 184 from sliding to a position that would release charging port 22. As illustrated in FIG. 9, an inner end 246 of pin 244 is provided with a chamfered head portion 248. Escape of refrigerant is substantially prevented through the use of at least one sealing member 250, such as an O-ring, between pin 240 and body portion 58. Valve housing 82 is provided with a chamfered end 252 that engages head portion 248 as valve housing 82 is moved to a forward position toward outlet end 62. This engagement, either alone or in combination with the refrigerant pressure present between valve housing 82 and body portion 58 due to the opening of service valve 118 and port valve 44, causes pin 244 to move outwardly until a portion of pin 244 protrudes from body portion 58. The protruding portion of pin 244 engages and prevents the inadvertent retraction of locking sleeve 184 when valves 118 and 44 are open. Once valve housing 82 is moved to a rearward position toward adjustment end 60 and valves 188 and 44 are closed, locking sleeve 184 can be retracted causing pin 244 to be pushed into body portion 58.

A further alternative embodiment of the present invention, a dual function service coupling 20' is disclosed in FIGS. 10–14. In the embodiments discussed above, male charging port 22' includes a push-pin type valve 44. However, under some circumstances it is desirable to incorporate a screw type valve as described below. Also, in the embodiments discussed above, the "valve assembly" consists of a valve housing 82 that is moved axially by direct connection to knob 70. Housing 82 contains spring loaded valve 118 with dowel pin 228 that is pushed open by the male service port body and in turn pushes open the male service port valve.

The embodiment discussed below differs in that the "valve assembly" consists of a shaft that is moved axially by direct connection to the knob. A spring loaded safety sleeve works in conjunction with the shaft to perform the valve function. The safety sleeve is opened when it contacts the end of the male service port, while the male service port valve is pushed open by the shaft. A more detailed description follows. The common actuator is the Knob. A more detailed description of the embodiment now follows including specific element numbers based on the included figures.

The screw-type valve 302 includes the use of mating threads 303, 304 between an inner peripheral surface of the port 22' and an outer peripheral surface of the valve to retain the valve within the charging port. Threads 303, 304 are threaded in a first direction (e.g., left handed) while the threads associated with the shaft are threaded in the opposite direction (e.g., right handed). A retaining ring 305 is also illustrated to prevent accidental disengagement of valve 302 from port 22' if valve 302 continues to be unscrewed from port 22' with an end chamfer of threads 304 engaging ring 305.

An inner peripheral surface 306 of valve 302 and an outer peripheral surface 307 on a nose portion 356 of a shaft 350 are mating hex drive elements, which could be "Allen", "Torx" or any other suitable design. When the hex drive engages, the non-circular male and female elements 306, 307 permit rotational movement of valve 302 with respect to port 22' by way of threads 303, 304 to cause longitudinal movement of valve 302 within port 22' along axis A—A. Coupling 20' is designed to work in an operationally equivalent manner whether push-pin type valve 44 or screw-type valve 302 is incorporated into charging port 22'. Therefore, a service technician does not need to know or care what type of charging port valve is incorporated into the system. For the purpose of discussion, portions of both types of valves are illustrated in the charging port 22' of the figures, but as a practical matter one or the other of the valves will typically be incorporated into the charging port. Element numbers introduced above are incorporated into coupling 20' to the extent practical and have the same purpose as discussed above except as otherwise noted.

Figure 10A:
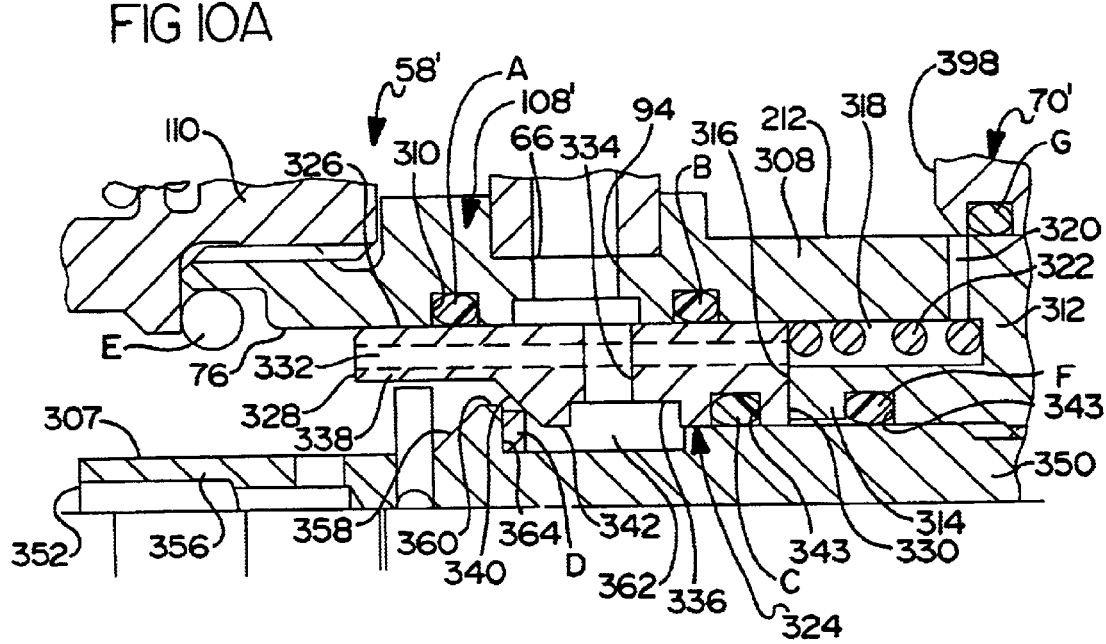
FIG. 10A is an enlarged portion of the service coupling of FIG. 10.
Figure 10B:
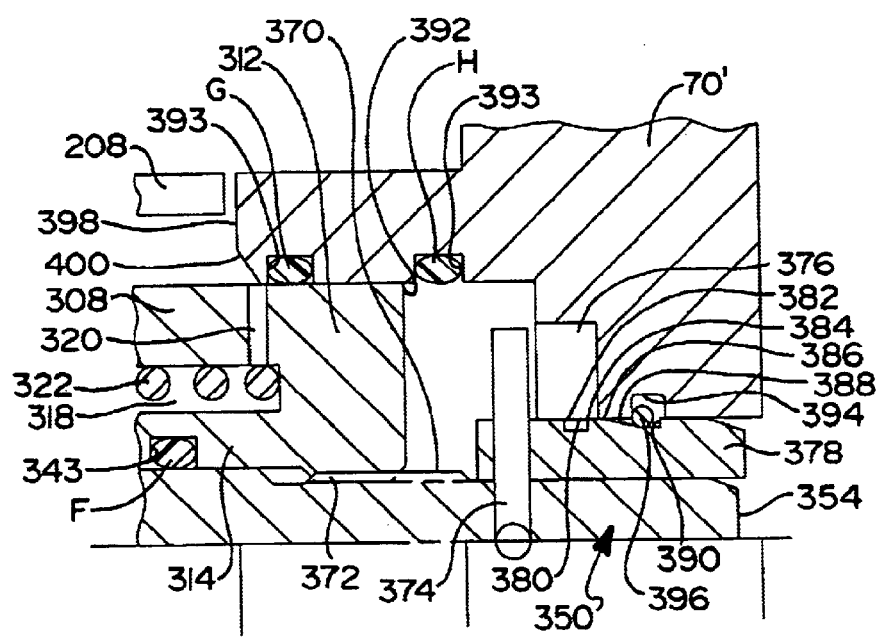
FIG. 10B is an enlarged portion of the service coupling of FIG. 10.

As best seen in FIGS. 10, 10A and 10B, service coupling 20' includes a body portion 58' that extends from an adjustment end 60 to an outlet end 62 and is rigidly maintained in position. Once again body portion 58' includes two sections 108' and 110, where section 110 is essentially identical to that discussed above. Section 108' has a number of differences, however. First, it is somewhat "J" shaped in cross section with a radially outer, longitudinally extending leg 308 defined between an inner surface defined by an internal diameter 76 and an outer surface defined by an external diameter 212. Leg 308 includes at least one flow hole 94 extending there through between the outer and inner surfaces, with radial grooves 310 disposed on each side of holes 94 into the inner surface, which are adapted to receive annular sealing elements A–B. While elastomeric O-rings are shown, it may be necessary to use other types of seals such as the PTFE spring-energized "U-Cup" discussed above, particularly for a CO2 application to eliminate explosive decompression. A web 312 connects leg 308 with a shorter radially inner leg 314 that terminates at an end 316 spaced longitudinally away from both grooves. Three-dimensionally, elements 308 and 314 are generally cylindrical with element 314 being radially inwardly of element 308, web 312 being disposed there between. Thus, the two legs 308, 314 and web 312 define a cavity 318. A vent hole 320 extends through leg 308 of the illustrated cross section adjacent to web 312, terminating within cavity 318. A resilient member 322 such as a spring is retained within cavity 318 with a first end engaging web 312 and a second end extending longitudinally outside of the cavity.

A safety sleeve 324 acting as the valve housing is disposed adjacent to end 316 of leg 314 and in facing contact with the inner surface of leg 308 outside of cavity 318. A radially outer surface 326 engages sealing elements A and B. Safety sleeve 324 is defined between a first end 328 and a second end 330, one or more bleed holes 332 extending longitudinally through the safety sleeve between the two ends 328, 330. Second end 330 is in selective contact with end 316 of body portion leg 314 and in constant contact with spring 322, and is biased toward a closed position and toward charging port 22' as described further below. Safety sleeve 324 also includes one or more flow holes 334 extending from outer surface 326 and terminating at an inner radial surface 336. Flow holes 334 do not intersect bleed holes 332. Safety sleeve 324 has a thin nose portion 338 adjacent to first end 328. A transition zone including an angled chamfer 340 and an apex 342 with a longitudinally extending flat is disposed between nose portion 338 and flow holes 334. Preferably apex 342 includes an internal diameter smaller than inner radial surface 336. When end 330 of safety sleeve 324 is in contact with end 316 of body portion leg 314, the selective interaction between chamfer 340 and apex 342 in combination with sealing element D limits the rearward travel of a shaft 350.

Radially inner surfaces of sleeve 324 adjacent second end 330 and leg 314 adjacent end 316 include a groove 343 adapted to retain sealing elements C and F respectively. Sealing elements C and F are disposed on either side of the point of interface between safety sleeve 324 and leg 314 in part to prevent fluid flow into cavity 318 when the safety sleeve engages the leg to seal the cavity with the exception of bleed holes 332. Additional features of the sealing elements are discussed further below in combination with the functional position of service coupling 20'.

A longitudinally extending shaft 350 acts as service valve 118, but includes additional functionality as well. It is received in an interior passageway defined by safety sleeve 324 radially inwardly of pressure balancing passage 328. Shaft 350 extends between a first end 352 and a second end 354. Hex element 307 is disposed on an outer surface of shaft 350 adjacent first end 352, and adapted to mate with corresponding complementary hex element 306 of threaded-valve 302 to open and close the charging port 22' when it includes this type of valve as discussed in more detail below. When a push-pin type valve 44 is used, first end 352 engages the valve to open and close the valve as also discussed in more detail below.

Shaft 350 includes a nose portion 356 adjacent to first end 352 having an outer diameter with a transition zone defined by an angled chamfer 358 and an apex 360 adjacent to hex element 307. Apex 360 has an outer diameter greater than the diameter of nose portion 356 and a longitudinally extending flat portion. A groove 362 is disposed adjacent to the transition zone, with a sharply angled, generally perpendicular shoulder 364 adjacent to apex 360 defining one of the walls of the groove. A sealing member D is disposed against shoulder 364. Typically, the sealing member D is bonded to the shoulder 364. However, a groove type arrangement may also be used. The relative diameters of apex 334 and 360, respectively, as well as the relative longitudinal positions of the transition zones of safety sleeve 324 and shaft 350, respectively, result in the selective engagement of sealing member D against chamfer 340 as discussed in greater detail below. Shaft 350 threadingly engages leg 314 of valve body section 108' adjacent to web 312 using threads 370, 372, which are threaded oppositely to threads 303, 304 to permit the longitudinal movement of the shaft with respect to valve body 58'.

As best seen in FIG. 10B, disposed between threads 370, 372 and shaft end 354 are one or more outwardly extending circumferentially spaced drive pins 374 disposed within mating holes within shaft 350. Drive pins 374 are adapted to engage drive slots 376 disposed within a rotatable knob 70'. Positioned between and extending from drive pins 374 and shaft end 354, a shaft sleeve 378 is pinned or otherwise secured to shaft 350, and includes a front groove 380 with a sharply angled, generally perpendicular front wall 382, a significantly angled ramp 384 forming the rear wall of the front groove, an apex 386 with a longitudinally extending flat adjacent to ramp 382 and a shoulder 388 having a shallower angle than ramp 384 adjacent the other longitudinal end of apex, and terminating into a rear groove 390 having a sharply angled, generally perpendicular wall 392 at the end opposite the groove. Shaft 350 may include the indicated elements directly rather than relying on the use of shaft sleeve 378.

Knob 70' includes a simple retaining ring groove 394 adapted to receive a retaining ring 396 such that as the knob moves longitudinally between an engaged and disengaged position, retaining ring 396 is moved between front groove 380 and rear groove 390 as discussed in more detail below. Shaft sleeve 378 is included in the illustrated embodiment to allow flexibility in the sizing of the torque controlling retaining ring, but may not be needed. An inner radial surface 392 of knob 70' includes two longitudinally disposed grooves 393 adapted to retain sealing members G and H. Members G and H selectively engage the outer surface of section leg 308 of body portion 58' and defined by diameter 212 in part to provide a fluid tight seal when vent hole 320 is disposed there between. A longitudinally inner end 398 of knob 70' includes an optional chamfer 400 such that when knob 70' is in its fully retracted orientation, vent holes 320 are open to the outer environment.

FIG. 10 shows the dual function service coupling 20' in a disconnected orientation with knob 70' fully retracted. Seals A through D work in conjunction to prevent leakage from the pressurized supply hose port 66, regardless of the position of knob 70'. Prior to attachment to charging port 22', coupling 20' is often pressurized through the supply hose 450 that is attached to the service equipment. Seals A and B on either side of flow holes 94 are sealing on the same diameter and prevent leakage between safety sleeve 324 and body portion 58'. Seals C and D prevent leakage between shaft 350 and safety sleeve 324. This sealing arrangement results in safety sleeve 324 being substantially pressure balanced such that only the biasing force of resilient member 322 is acting to hold the safety sleeve sealed against seal D in a closed position. Such an orientation minimizes the rotational force required to turn knob 70'. In the position of FIG. 10 or 11, the other four seals E through H are not pressurized.

In FIG. 10, knob 70' is fully retracted with knob retaining ring 396 positioned in the rear groove 390 of shaft sleeve 358, which in turn is rigidly connected to shaft 350. The drive pin 374 retained in shaft 350, and optionally all of the way through it, is disengaged from corresponding drive slots 376 in knob 70'. Thus, knob 70' may be turned freely.

Vent hole 320 is uncovered, permitting any trapped pressure to escape when knob 70' is moved to the shown position following service. Release sleeve 184 may be retracted to allow connection or disconnection to male charging port 22' as already discussed above.

FIG. 11 discloses the functionality of safety sleeve 324. In the figure, the knob 70' is advanced from its disengaged position, but the valve is still closed as in FIG. 10. No charging port 22' is connected to coupling 20'. Vent hole 320 is closed, and sealed between sealing elements G and H received in grooves 393 on an interior circumferential surface of knob 70'. Retaining ring 396 is disposed in front groove 380 and retaining pins are received within drive slots 376.

Yet, no undesirable pressure release has taken place. This is because safety sleeve 324 is spring loaded by spring 322 to a closed position and will always remain in its closed position, as illustrated regardless of the position of knob 70', when not secured to charging port 22'.

In FIG. 12, coupling 20' is shown connected to charging port 22'. During this connection, the hex elements 306, 307 are engaged if applicable such that a clockwise rotation of shaft 350 results in a longitudinal movement of valve 302 toward end 328 of safety sleeve 324. In the case of push-pin valve 44, nose portion 356 of shaft 350 includes a chamfer 452 adapted to engage end 454 of valve 44 when shaft 350 has been advanced sufficiently to engage and move valve 44 to the left in the figure. In the figure, insufficient longitudinal advancement has resulted to cause mutual engagement.

Knob 70' has been pushed forward longitudinally with minimal effort until retaining ring 396 rides up shallow angled shoulder 388 out of groove 390, over apex 386 and into front groove 380. During this motion, drive pin 374 engages a mating drive slot 376 in knob 70' such that any clockwise rotation of the knob will rotate and advance shaft 350 because of the mating engagement of threads 370, 372 between shaft 350 and body portion 58'. Further, by pushing knob 70' forward vent hole 320 is sealed as discussed with respect to FIG. 11.

FIG. 13 shows coupling 20' in the attached and opened position. Interlock sleeve 208 functions in combination with locking sleeve 184 as already discussed above. As compared to FIG. 12, knob 70' has now been turned clockwise to cause shaft 350 to advance toward secured charging port 22'. If coupling 20' is attached to screw-type valve 302, the screw will be un-torqued and loosened about three (3) turns until one or more cross pins 456, extending radially outwardly from shaft 350, and just adjacent to chamfer 358, engages end 28 of port 22'. Because threads 303 are left handed when corresponding shaft threads 370, 372 are right-handed, valve 302 will back out as shaft 350 advances, resulting in increased engagement of the hex drive.

On the other hand, if coupling 20' is attached to a push-pin type valve 44, chamfer 452 of shaft 350 will move end 454 of valve 44 to an open position. The process works as follows: As knob 70' is rotated clockwise from the position shown in FIG. 12 to the position shown in FIG. 13, the safety sleeve 324 initially moves with the shaft until end 328 contacts end 28 of the port 22, and chamfer 452 of shaft 350 engages end 454 of valve 44. At this point, continued advancement of shaft 350 to the left results in safety sleeve 324 moving from its closed position to an open position against the force of resilient member 322, causing seal D to disengage sealing on safety sleeve 324 and at approximately the same time, shaft 350 pushes open the valve in port 22'. This releases pressure into cavity 458. The pressure in cavity 458 is free to pass through the pressure balancing hole(s) 332 in safety sleeve 324 and therefore, cavity 318 quickly reaches generally the same pressure (with the limited exception of a small area at end 354 of shaft 350). End 28 does not block bleed holes 332. Cross pins 456 selectively engage end 28 to limit travel of shaft 350. The balanced pressure means that only minimum force is required to rotate knob 70'.

In the open orientation seal E prevents leakage between body portion 58' and the male charging port 22'. Seal F prevents leakage between body portion 58' and shaft 350. Seals G and H prevent leakage between outer diameter 212 of body portion 58' and knob 70'. Seals G and H are positioned on either side of bleed hole 320 to provide pressure balancing to minimize the effort required to move knob 70'. Seals A through D are pressurized from all sides, but do not perform any necessary sealing function.

After servicing, knob 70' is rotated counterclockwise to close the valves. If attached to screw type valve 302, shaft 350 will rotate with the knob until the screw valve is properly seated. Further rotation of knob 70' will apply a predetermined torque value to the screw as follows. The engagement feature of knob 70' is in the shape of a "saw tooth" with at least two teeth that engage drive pin 374 through shaft 350. As knob 70' is turned counter-clockwise, pin 374 rides up the angle defined by the saw-tooth with a camming effect. This tends to force pin 374 out of engagement with knob 70'. Resisting this action is retaining ring 396 retained in front groove 380 of shaft sleeve 358. At a predetermined torque value the retaining ring 396 is forced up the relatively steep angle of ramp 384 and over apex 386 to then travel down shoulder 388 into rear groove 390. This allows knob 70' to move rearward relative to the shaft 350, again uncovering vent hole 320. Knob 70' is free to rotate.

If charging port 22' includes a push-pin valve 44, shaft 350 retracts until safety sleeve 324 contacts body 58' by way of the engagement between sealing member D retained in groove 362 of shaft 350 and chamfer 340 of safety sleeve 324. Further rotation of knob 70' disengages the knob from shaft 350 as discussed above for the threaded type valve.

Bleed hole 332 connected between cavities 458 and 318 allows the pressure trapped between charging port 22' and service coupling 20' to be released when knob 70' uncovers vent hole 320.

Figure 14:
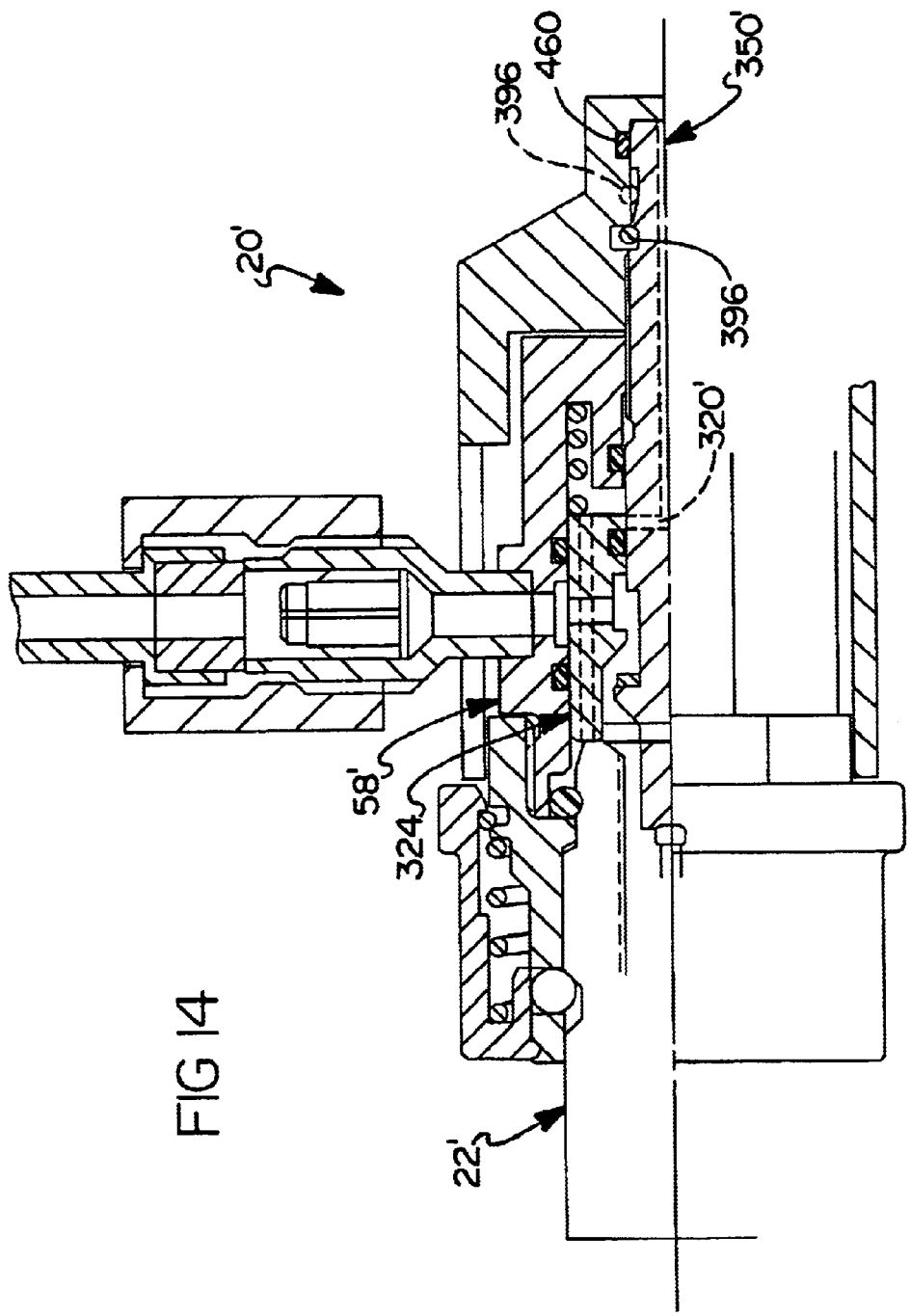
FIG. 14 is an alternative embodiment of a dual function service coupling.

An alternative embodiment of coupling 20' is illustrated in FIG. 14, wherein vent hole 320' is disposed within the interior of shaft 350' rather than as shown in FIGS. 10–13. A vent hole seal 460 slides off shaft 350' when knob 70' moves back to a retracted position to permit atmospheric release of pressure.

Although certain preferred embodiments of the present invention have been described, the invention is not limited to the illustrations described and shown herein, which are deemed to be merely illustrative of the best modes of carrying out the invention. A person of ordinary skill in the art will realize that certain modifications and variations will come within the teachings of this invention and that such variations and modifications are within its spirit and the scope as defined by the claims.

What is claimed is:

1. A service coupling for connecting a fluid source to a fluid system having a charging port that includes an axially displaceable port valve, comprising:
    (a) a body portion extending along an axis from an adjustment end to an outlet end, the body portion including a central passageway and a lateral port positioned between the ends to provide communication between the central passageway and the fluid source;
    (b) an axially moveable valve housing received in the central passageway, the valve housing including a fluid flow opening in communication with the lateral port to form a flow path, and at least one pressure balancing passage extending there through between opposing longitudinal ends; and
    (c) an actuator for permitting the movement of the valve housing from a rearward position toward the adjustment end to a forward position toward the outlet end, wherein axial movement of the actuator results in disengagement of the port valve from sealing engagement in the charging port to open the flow path, and wherein as the flow path is opened, the at least one pressure balancing passage results in the pressure being substantially balanced on either end of the valve housing.

2. A service coupling as recited in claim 1, wherein the charging port comprises one of a push-pin type valve and a screw-type valve, only one of the valves being required to open and close the port.

3. A service coupling as recited in claim 1, wherein a first cavity is disposed on a side of the valve housing adjacent to the port valve and a second cavity is disposed adjacent an opposing side of the valve housing, the pressure balancing passage disposed between the first cavity and the second cavity.

4. A service coupling as recited in claim 3, wherein the body portion includes the second cavity, the second cavity defined in part by a second leg disposed radially inwardly of a first leg, the opposing side of the valve housing in selective contact with the second leg.

5. A service coupling as recited in claim 4, wherein a resilient member is received within the second cavity, the resilient member biasing the valve housing toward the outlet end.

6. A service coupling as recited in claim 5, wherein the valve housing includes an interior passageway, the actuator being received within the interior passageway.

7. A service coupling as recited in claim 6, wherein the interior passageway of the valve housing is radially inward of the pressure balancing passageway.

8. A service coupling as recited in claim 6, wherein in a closed position, a surface of the actuator is sealed against a corresponding surface of the valve housing to close the flow path, and wherein in an open position, the actuator is displaced with respect to the valve housing to engage the port valve and open the flow path.

9. A service coupling as recited in claim 8, wherein an end of the charge port selectively engages the valve housing as the actuator moves toward an open position in engagement with the port valve, resulting in the actuator selectively moving with respect to both the valve housing and the charge port.

10. A service coupling as recited in claim 8, wherein a sealing element is disposed between the surface of the actuator and the corresponding surface of the valve housing.

11. A service coupling as recited in claim 10, wherein at least one of the surface of the actuator and the corresponding surface of the valve housing includes a chamfer.

12. A service coupling as recited in claim 10, wherein a second sealing element is disposed between a second surface of the actuator and a second surface of the valve housing, the second sealing element inhibiting the flow of fluid between the actuator and the valve housing.

13. A service coupling as recited in claim 4, wherein a surface of the actuator is in facing relationship to the second leg.

14. A service coupling as recited in claim 13, wherein a seal is disposed between the surface of the actuator and the second leg to inhibit the flow of fluid between the actuator and the body portion.

15. A service coupling as recited in claim 1, wherein the actuator is a shaft adapted to move longitudinally toward and away from the charge port, the shaft including a nose portion adapted to selectively engage the port valve to move it between a closed position and an open position.

16. A service coupling as recited in claim 15, wherein the nose portion has a non-circular profile adapted for mutual engagement with a corresponding profile of a mating port valve such that rotation of the shaft results in rotation of the valve relative to the charge port.

17. A service coupling as recited in claim 16, wherein the port valve threadingly engages the charge port.

18. A service coupling as recited in claim 15, wherein the nose portion selectively engages a push pin associated with the port valve.

19. The service coupling according to claim 1, further including at least one bleed passage for venting fluid trapped between the service coupling and the charge port prior to disconnection.

20. The service coupling according to claim 1, wherein the lateral port includes a coupling member having a restrictor that restricts fluid flow through the service coupling in a first direction and permits substantially unrestricted fluid flow in a second direction opposite the first direction.

21. A service coupling for connecting a fluid source to a fluid system, comprising:
    (a) a charging port that includes an axially displaceable port valve, the valve being of either a push-pin type or a screw-type;
    (b) a body portion extending along an axis from an adjustment end to an outlet end, the body portion including a central passageway and a lateral port positioned between the ends to provide communication between the central passageway and the fluid source;

(c) an axially moveable safety sleeve received in the central passageway, the safety sleeve including a fluid flow opening in communication with the lateral port to form a flow path, and at least one pressure balancing passage extending there through between opposing longitudinal ends, a first cavity being disposed on a side of the safety sleeve adjacent to the port valve and a second cavity being disposed adjacent an opposing side of the safety sleeve, the pressure balancing passage disposed between the first cavity and the second cavity; and (d) an actuator for permitting the movement of the safety sleeve from a rearward position toward the adjustment end to a forward position toward the outlet end, wherein axial movement of the actuator results in disengagement of the port valve from sealing engagement in the charging port to open the flow path, and wherein as the flow path is opened, the at least one pressure balancing passage results in the pressure being substantially balanced on either end of the safety sleeve.

22. A service coupling as recited in claim 21, wherein the actuator is a shaft adapted to move longitudinally toward and away from the port valve, the shaft including a nose portion adapted to selectively engage the port valve to move it between a closed position and an open position.

23. A service coupling as recited in claim 22, wherein the nose portion has a non-circular profile adapted for mutual engagement with a corresponding profile of a screw type port valve; and wherein the nose portion is further adapted for mutual engagement with a push pin associated with a push-pin type port valve.

24. A service coupling for connecting a fluid source to a fluid system, comprising:

(a) a body portion extending along an axis from an adjustment end to an outlet end, the body portion including a central passageway and a lateral port positioned between the ends to provide communication between the central passageway and the fluid source;

(b) an axially moveable safety sleeve received in the central passageway, the safety sleeve including a fluid flow opening in communication with the lateral port to form a flow path, and an interior passageway; and (c) a shaft moveable within the interior passageway of the safety sleeve for selectively permitting the movement of the safety sleeve from a rearward position toward the adjustment end to a forward position toward the outlet end, wherein axial movement of the shaft results in disengagement of the port valve from sealing engagement in the charging port to open the flow path, the shaft including a nose portion with a non-circular profile adapted for mutual engagement with a corresponding profile of a first specific type port valve; and wherein the nose portion is further adapted for mutual engagement with a push pin associated with a second specific type port valve.

25. A service coupling as recited in claim 24, wherein the body portion includes a cavity defined between two legs, an end of the safety sleeve in selective contact with one of the legs of the body portion when the port valve is closed.

26. A service coupling as recited in claim 25, wherein a resilient member is received within the cavity to bias the safety sleeve axially away from the body portion.

27. A service coupling as recited in claim 26, wherein the shaft threadingly engages the body portion such that the shaft moves with respect to the body portion.

28. A service coupling as recited in claim 27, wherein as the shaft moves toward the charge port, the safety sleeve is biased away from the cavity by the resilient member.

29. A service coupling as recited in claim 28, wherein an end of the charge port selectively engages the safety sleeve as the shaft moves toward an open position in engagement with the port valve, resulting in the shaft selectively moving simultaneously with respect to the body portion, the safety sleeve and the charge port.

* * * * *